US008723029B2

United States Patent
Pyczak et al.

(10) Patent No.: US 8,723,029 B2
(45) Date of Patent: May 13, 2014

(54) ELECTRIC CABLE DEVICE FOR FIXING ELECTRIC CABLE WIRES, CONNECTING CONTACT AND METHOD OF MANUFACTURING AN ELECTRIC CABLE

(75) Inventors: Andreas Pyczak, Hilzingen (DE);
Thomas Renz, Donaueschingen (DE);
Rolf Sticker, Donaueschingen (DE)

(73) Assignee: MC Technology GmbH, Blumberg (DE)

( * ) Notice: Subject to any disclaimer, the term of this patent is extended or adjusted under 35 U.S.C. 154(b) by 215 days.

(21) Appl. No.: 13/212,835

(22) Filed: Aug. 18, 2011

(65) Prior Publication Data

US 2012/0061138 A1 Mar. 15, 2012

(30) Foreign Application Priority Data

Sep. 15, 2010 (DE) .......................... 10 2010 045 444

(51) Int. Cl.
*H01B 7/00* (2006.01)
(52) U.S. Cl.
USPC ......................................... 174/33; 174/113 R
(58) Field of Classification Search
USPC .................................... 174/27, 32, 33, 113 R
See application file for complete search history.

(56) References Cited

U.S. PATENT DOCUMENTS 2,086,629 A * 7/1937 Mead ............................. 333/243
5,966,056 A * 10/1999 Thornton ............................ 333/5
6,290,532 B1 9/2001 Vermeersch et al.
6,486,405 B2 * 11/2002 Lin ............................ 174/113 R
2006/0035513 A1 2/2006 Yohn et al.
2006/0237218 A1 10/2006 Glew
2008/0233794 A1 9/2008 Clark et al.

FOREIGN PATENT DOCUMENTS

| DE | 376 880 C | 6/1923 |
| DE | 558 622 B | 8/1932 |
| DE | 626 276 C | 2/1936 |

(Continued)

OTHER PUBLICATIONS

EPO Search Report from corresponding European application No. 11 175 757, dated Mar. 27, 2012.

*Primary Examiner* — Chau N Nguyen
(74) *Attorney, Agent, or Firm* — Todd L. Juneau

(57) ABSTRACT

The invention relates to an electric cable (10) with at least four, preferably exactly four, wires (A, B, C, D) arranged in a first and a second pair, wherein each of the pairs comprises a first (A, B) and a second wire (C, D) each, wherein the wires (A, C) belonging to the first pair are arranged parallel to each other on a first plane at least in a first (11) and a third longitudinal section (13), and the wires (B, D) belonging to the second pair are arranged parallel to each other on a second plane and the two planes intersect in a line of intersection, wherein the line of intersection runs parallel to the wires (A, B, C, D) and the distances between one wire (A, B, C, D) each and the line of intersection are identical, wherein the angle of intersection (γ) between the planes is 90° in at least the first longitudinal section (11) and wherein the first wire (A) of the first pair is transposed with the first wire (B) of the second pair and the second wire (C) of the first pair is transposed with the second wire (D) of the second pair in a second longitudinal section (12), wherein the angle of intersection (α) between the planes is different from 90° at least in the third longitudinal section (13).

3 Claims, 4 Drawing Sheets

(56) References Cited

FOREIGN PATENT DOCUMENTS

| DE | 950 379 B | 7/1949 |
| DE | 10 03 303 A | 10/1954 |
| DE | 17 19 419 U | 3/1956 |
| DE | 17 19 419 U | 3/1958 |
| DE | 44 18 259 C1 | 8/1995 |
| DE | 199 57 545 A1 | 9/2001 |
| EP | 1 422 791 A1 | 5/2004 |

* cited by examiner

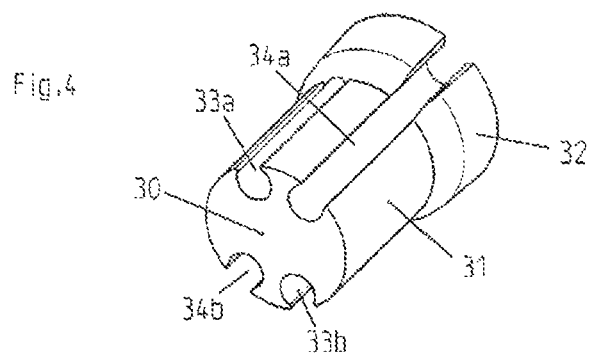
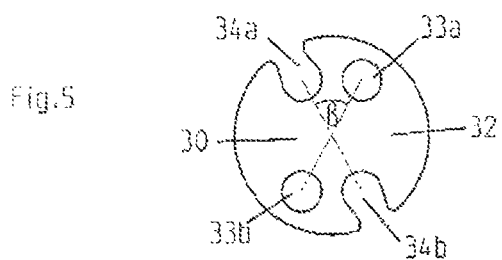
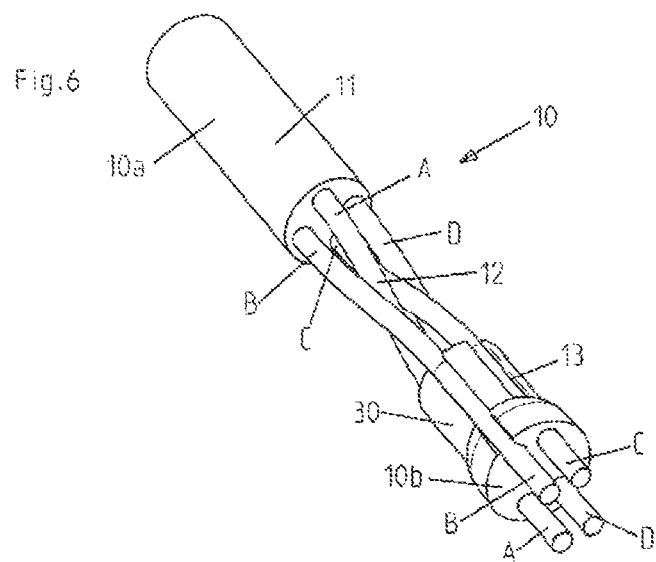

ELECTRIC CABLE DEVICE FOR FIXING ELECTRIC CABLE WIRES, CONNECTING CONTACT AND METHOD OF MANUFACTURING AN ELECTRIC CABLE

CROSS REFERENCE TO RELATED APPLICATIONS

The present application claims priority to German Patent Application No. 10 2010 045 444.3, filed Sep. 15, 2010.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

DESCRIPTION

Electric cord, appliance for fastening wires of an electric cable, connecting contact and method for the manufacture of an electric cable.

The invention relates to an electric cable according to the characterizing clause of patent claim 1, an appliance for fastening wires of an electric cable.

Electric cables with at least four, preferably exactly four, wires have been disclosed in the prior art, which are arranged in a first and a second pair, wherein each of the pairs comprises a first and a second wire each, wherein at least the wires belonging to the first pair are arranged parallel to each other on a first plane in a first longitudinal section and the wires belonging to the second pair are arranged parallel to each other on a second plane, and the two planes intersect in one of the lines of intersection, wherein the line of intersection runs parallel to the wires and the distances between one wire and the line of intersection each are identical, wherein the angle of intersection between the planes equals 90° in at least the first longitudinal section. Cables with said arrangement of wires are referred to as star quad cables. Star quad cables are frequently used in particular in the field of automation engineering for the transmission of Ethernet signals and have long been known in the field of telephone engineering.

EP 1 422 791 A1 discloses an arrangement of contacts in a plug-and-socket connector in such a way that the spatial arrangement of the star quad remains intact.

Furthermore, so-called cable managers, i.e. cable-organizing inserts for connecting contacts used to fasten the wires of an electric cable at a defined relative position from each other have been disclosed. Said cable-organizing insert is disclosed, for example, in DE 10 2009 010 492 B3.

Cables are often equipped with a plug on both ends, with an identical pin assignment. Said cables are referred to as so-called patch cables.

Figure 1:
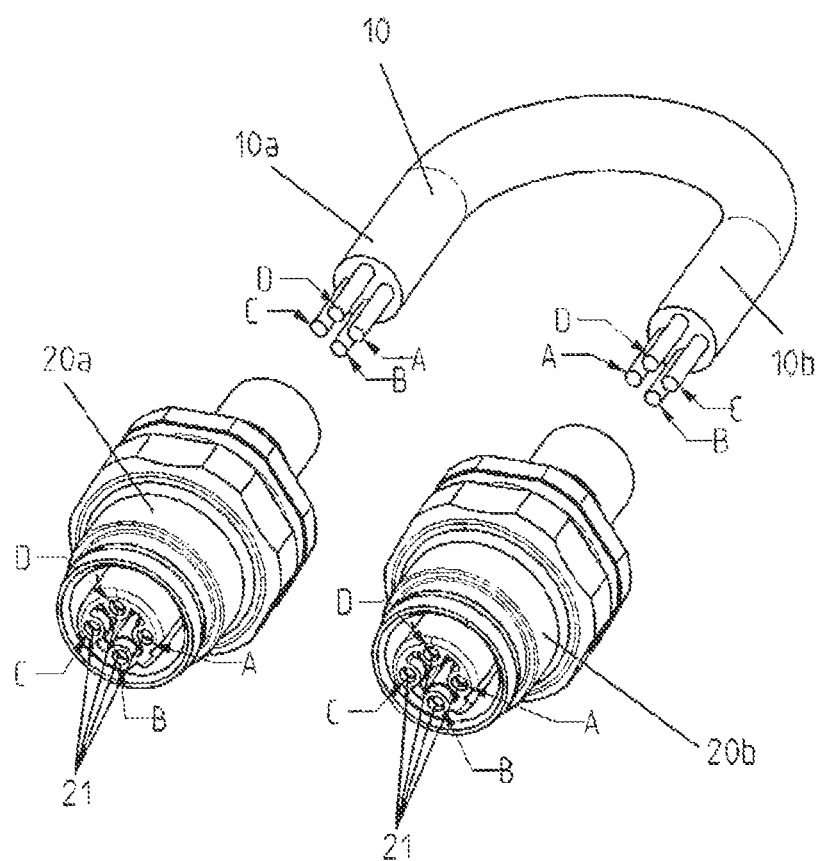
Figure 2A:
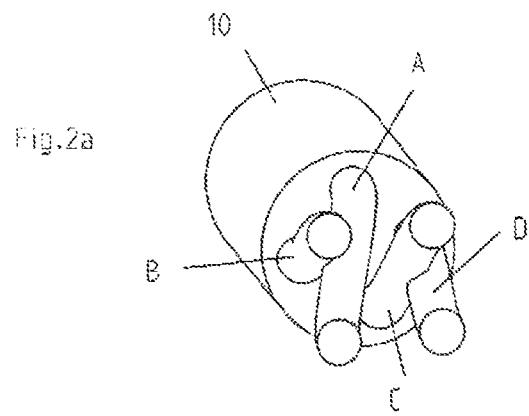
Figure 2B:
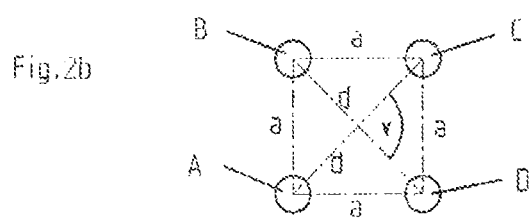

FIG. 1 shows a cable 10 with 4 wires A, B, C, D arranged in a first and a second pair. The first pair comprises a first wire A and a second wire C, while the second pair comprises a first wire B and a second wire D. The wires A, C belonging to the first pair are arranged parallel to each other on a first plane at a distance d, while the wires B, D belonging to the second pair are arranged parallel to each other on a second plane at a distance d. The two planes intersect in a line of intersection which runs parallel to the wires A, B, C, D. In the process, the sections between one wire A, B, C, D each and the line of intersection are identical. The angle of intersection between the planes is 90°. This means in particular that the distance between two neighboring wires, i.e. the distance a between the wires A and B, the distance a between the wires A and D, the distance a between the wires B, C, as well as the distance a between the wires C, D, are identical (cp. FIG. 2b). If the wires at a first end 10a of the cable 10 are arranged in a clockwise view A, B, C, D, then the wires are arranged in the clockwise order A, D, C, B with a top view of the second end 10b of the corresponding cable 10. Both ends 10a, 10b of the cable 10 comprise a connecting contact 20a, 20b each. The connecting contacts 20a, 20b can be designed as bushings as illustrated in FIG. 1. Alternatively, the connecting contacts 20a, 20b can be designed as plugs. It is essential that the type of both connecting contacts 20a, 20b is identical. If connecting contacts 20a, 20b are supposed to be installed on both ends 10a, 10b of the cable 10, whose contacts 21 have the same pin assignment, namely in particular an assignment of the contacts 21 in a clockwise direction in the order A, B, C, D, it is necessary to transpose the wires (cp. FIG. 2a). For wire transposition, the first wire A of the first pair is transposed with the first wire B of the second pair and the second wire C of the first pair is transposed with the second wire D of the second pair. Said transposition means that the routing of the first wire A of the first pair and the first wire B of the second pair is essentially switched after the transposition and the routing of the second wire C of the first pair and the second wire D of the second pair is also essentially switched. The wire transposition achieves that the arrangement of the wires in a clockwise direction is A, B, C, D, with a top view of the two ends 10a, 10b of the cable 10. As evident from FIG. 2 in combination with FIG. 1, the connecting contact 20b with the identical pin assignment as connecting contact 20a can then be applied to the transposed end 10b of the cable 10. However, the wire transposition significantly reduces the transmission properties of the cable.

Therefore, the object of the invention is to provide a wire arrangement aimed at compensating the effects caused by the wire transposition to the greatest possible extent and at improving the transmission properties of a cable with transposed wires.

The object of the invention is solved with an electric cable with the properties of patent claim 1.

Advantageous embodiments and updated versions of the invention are described in the related claims.

The electric cable according to the invention with at least four, preferably exactly four, wires arranged in a first and a second pair, wherein each of the pairs comprises a first and a second wire each, wherein at least the wires belonging to the first pair are arranged parallel to each other on a first plane in a first and a third longitudinal section and the wires belonging to the second pair are arranged parallel to each other on a second plane and the two planes intersect in a line of intersection, wherein the line of intersection runs parallel to the wires and the distances between one wire each and the line of intersection are identical, wherein the angle of intersection between the planes is 90° in at least the first longitudinal section and wherein the first wire of the first pair is transposed with the first wire of the second pair and the second wire of the first pair is transposed with the second wire of the second pair in a second longitudinal section, is characterized in that the angle of intersection between the planes is different from 90° in at least the third longitudinal section. As a result, two wires belonging to different pairs are routed at a closer parallel distance from each other after the transposition than in the first longitudinal section. This generates a high-frequency coupling which counters the unintended coupling in the region of the transposed wires and improves the transmission properties of the cable as a result.

The angle of intersection between the planes is preferably between 40° and 80°, preferably about 60°, in the third longitudinal section. Said angle of intersection results in a spatial proximity of the wires routed closer to each other which is particularly suitable to counter the unwanted coupling caused by the wire transposition.

According to a preferred embodiment of the invention, the cable comprises a first connecting contact and a second connecting contact, wherein the first longitudinal section is arranged in sections in the first connecting contact and the third longitudinal section is arranged in sections in the second connecting contact. A cable can be realized as easily as possible in this way, which is equipped with a connecting contact on both ends, with an identical pin assignment, i.e. in particular a so-called patch cable.

The appliance according to the invention for fastening at least four, preferably exactly four, wires of an electric cable, in particular an electric cable according to the invention, wherein the appliance comprises four retainers for the four wires, wherein the four retainers are arranged in a first pair and a second pair, wherein each of the pairs comprises a first and a second retainer each, wherein at least the retainers belonging to the first pair are parallel to each other on a first plane in a longitudinal section and the retainers belonging to the second pair are arranged parallel to each other on a second plane and the two planes intersect in a line of intersection, wherein the line of intersection runs parallel to the retainers and the distances between a retainer and the line of intersection are identical, is characterized in that the angle of intersection between the planes is different from 90°. By means of said appliance, the desired wire arrangement for compensating the crosstalk in the area of the transposed wires across a desired longitudinal section can be easily defined beyond the area of the transposed wires.

The retainers of the first pair are preferably designed at least in sections as feed-through openings and/or the retainers of the second pair at least in sections as half-open chambers arranged on the outside of the appliance. Said design of the appliance allows the simple reproduction of the arrangement and a reliable fastening of the wires relative to each other.

The chambers preferably comprise locking lugs allowing the corresponding fastening of the wires in the chambers.

An appliance according to the invention is used in particular in an electric cable as described above.

The connecting contact according to the invention which is preferably designed as snap-in connector for a cable comprising at least four, preferably exactly four, wires, wherein the four wires are arranged in a first and a second pair, wherein each pair comprises a first and a second wire each, wherein at least the wires belonging to the first pair are parallel to each other on a first plane in a first and a third longitudinal section and the wires belonging to the second pair are arranged parallel to each other on a second plane and the two planes intersect in a line of intersection, wherein the line of intersection runs parallel to the wires and the wires between one wire and the line of intersection are identical, wherein the angle of intersection between the planes is 90° in at least the first longitudinal section, is characterized in that the angle of intersection between the planes is different from 90° in at least the third longitudinal section. This way, the negative effects in the connecting contact caused by the wire transposition are largely compensated, making it possible to arrange the contacts in the known star quad arrangement.

It is particularly preferred if the connecting contact comprises an appliance for fastening at least four, preferably exactly four, wires of an electric cable as described above, so that a defined wire organization within the connecting contact can be easily realized.

The method according to the invention for the manufacture of an electric cable with at least four, preferably exactly four, wires arranged in a first and a second pair, wherein each of the pairs comprises a first and a second wire each, wherein at least the wires belonging to the first pair are arranged parallel on a first plane in a first longitudinal section and the wires belonging to the second pair are arranged parallel to each other on a second plane and the planes intersect in a line of intersection, wherein the line of intersection runs parallel to the wires, comprising the steps:

Lead through of the wires of the first pair through the feed-through openings of an appliance for fastening at least four, preferably exactly four, wires of an electric cable, wherein the appliance comprises four retainers for the four wires, wherein the four retainers are arranged in a first and a second pair, wherein each of the pairs comprises a first and a second retainer each, wherein the retainers belonging to the first pair are arranged parallel to each other on a first plane at least in one longitudinal section and the retainers belonging to the second par are arranged parallel to each other on a second plane and the two planes intersect in a line of intersection, wherein the line of intersection runs parallel to the retainers, wherein the distances between one retainer each and the line of intersection are identical and the angle of intersection between the planes is different from 90°, wherein the retainers of the first pair are designed as feed-through openings and the retainers of the second pair are designed as half-open chambers arranged on the outside of the appliance, Rotation of the appliance around its longitudinal axis around an angle of rotation greater than the angular distance between two neighboring wires, Insertion of the wires of the second pair into the half-open chambers.

This allows the easy reproduction of the wire transposition in an electric cable as well as the subsequent wire arrangement to compensate the effects caused by the wire transposition.

The invention is explained in detail based on the following figures.

In the figures

Figure 3A:
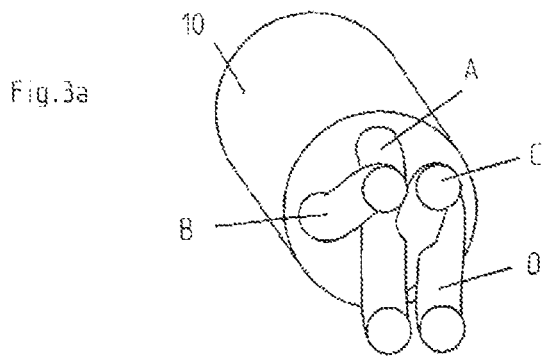
Figure 3B:
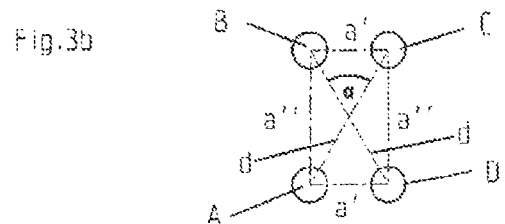
Figure 7:
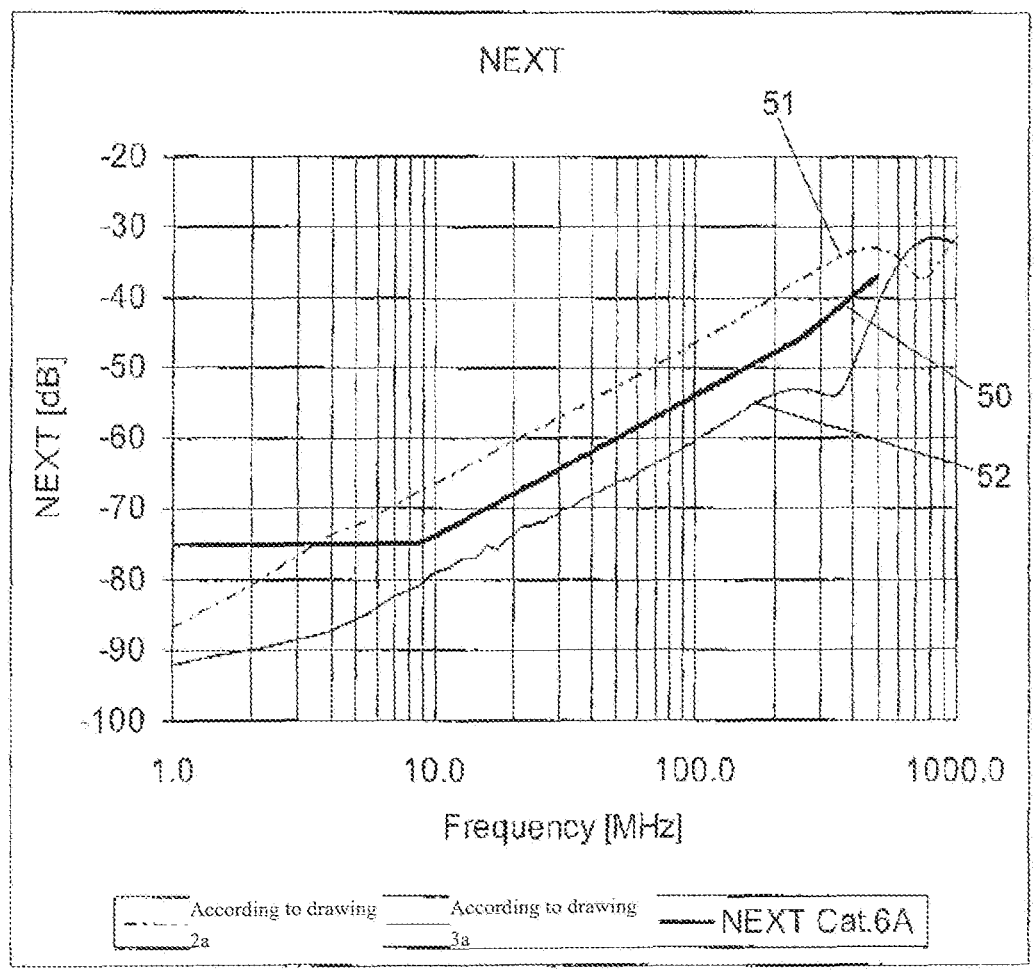

FIG. 1 shows a view in perspective of a cable with two connecting contacts,

FIG. 2a shows a view in perspective of a wire transposition according to the state of the art, FIG. 2b shows a sectional view through the wire arrangement of the cable according to FIG. 2a after the wire transposition according to the state of the art, FIG. 3a shows a view in perspective of a wire transposition according to the invention, FIG. 3b shows a sectional view through the wire arrangement of the cable according to FIG. 3a after the wire transposition according to the invention, FIG. 4 shows a view in perspective of an appliance for fastening wires, FIG. 5 shows a frontal view of the appliance according to FIG. 4, FIG. 6 shows a view in perspective of a section of a cable according to the invention, FIG. 7 shows a comparison of the transmission properties of a cable according to the state of the art with a cable according to the invention.

FIG. 1 shows a cable 10 with four wires A, B, C, D, wherein the wires A, C form a first pair as well as the wires B, D form a second pair. As shown in FIG. 6, the cable 10 according to the invention comprises a first longitudinal section 11 and a third longitudinal section 13, in which the wires A, C, belonging to the first pair are arranged parallel to each other on a first plane at a distance d and the wires B, D belonging to the second pair are arranged parallel to each other on a second plane at a distance d and the two planes intersect in a line of intersection, wherein the line of intersection runs parallel to the wires A, B, C, D and the distances a between one wire A, B, C, D each and the line of intersection are identical, namely in particular d/2. In the first longitudinal section, the angle of intersection γ between the planes is 90°.

FIG. 2b shows a cross section through a longitudinal section of a cable according to the state of the art, corresponding to a cross section through the first longitudinal section 11 of the cable 10 according to the invention.

A wire transposition is arranged in a second longitudinal section 12 between the first longitudinal section 11 and the third longitudinal section 13 (cp. FIGS. 3a and 6). In it, the first wire A of the first pair is transposed with the first wire B of the second pair and the second wire C of the first pair is transposed with the second wire D of the second pair. The transposition means in particular that the further routing of the corresponding wires is essentially switched after the transposition. The wire transposition achieves that the arrangement of the wires viewed in a clockwise direction is A, B, C, D with a top view of the two ends 10a, 10b of the cable 10. The same is also achieved if the first wire A of the first pair is transposed with the second wire D of the second pair and the second wire C of the first pair is transposed with the first wire B of the second pair.

In said wire transposition, the wires A, B, C, D are routed close to each other in such a way that crosstalk takes place between the corresponding wires A, B, and C, D. According to the invention, an angle of intersection a other than 90° is selected between the planes in the third longitudinal section 13 to compensate this effect (cp. FIG. 3b). Indeed, the distance d between the wires A, C of the first pair and the wires B, D of the second pair remains identical, two wires of different pairs, namely wires A, D and B, C are routed at a distance a' relative to each other that is smaller than in the first longitudinal section 11, while the respective other wires of different pairs, namely wires A, B and C, D are routed at a greater distance a" relative to each other than in the first longitudinal section 11, which specifically achieves a crosstalk between the wires A, D and B, C, aimed at compensating the coupling effect of the wire transposition as a result. The angle α preferably ranges between 40° and 80°, and is, for example, about 60°.

An appliance 30 according to the invention can be used to fasten the wires A, B, C, D in the third longitudinal section 13, which is illustrated in FIGS. 4, 5, and 6. The appliance 30 comprises a cylindrical first section 31 and a cylindrical second section 32, wherein the diameter of the second section 32 is greater than the diameter of the first section 31. The appliance 30 comprises four retainers 33a, 33b, 34a, 34b for retaining the wires A, B, C, D, wherein the four retainers 33a, 33b, 34a, 34b are arranged in a first pair 33a, 33b and a second pair 34a, 34b, wherein each of the pairs comprises a first retainer 33a, 34a, and a second retainer 33b, 34b each. The retainers 33a, 33b belonging to the first pair are arranged parallel to each other on a first plane at a distance d and the retainers 34a, 34b belonging to the second pair are arranged parallel to each other on the second plane at a distance d. The two planes intersect under an angle of intersection β in a line of intersection, wherein the line of intersection runs parallel to the retainers 33a, 33b, 34a, 34b and the distances between one retainer 33a, 33b, 34a, 34b each and the line of intersection are identical. The angle of intersection β between the planes is different from 90° and in particular corresponds to the angle of intersection a of the planes of the wire arrangement in the third longitudinal section 13. Consequently, the angle of intersection β is preferably between 40° and 80° and is, for example, about 60°.

in the first section 31, the retainers 33a, 33b, 34a, 34b are designed as longitudinal grooves arranged in a longitudinal direction on the outside of the cylindrical section 31. In the second section 32, the retainers 33a, 33b are designed as feed-through openings, while the retainers 34a, 34b are designed as half-open chambers arranged on the outside of the appliance 30. At least the retainers 34a, 34b comprise locking lugs at least in the second section 32, to fasten the wires A, B, C, D to be inserted in the retainers 34a, 34b. Furthermore, the retainers 33a, 33b, 34a, 34b can comprise locking lugs in a first section 31 in such a way that the wires to be inserted are retained by clamping in the corresponding retainers 33a, 33b, 34a, 34b.

The appliance 30 is used in particular as follows. In order for both ends 10a, 10b of the cable 10 according to FIG. 1 to have an identical pin assignment of the connection contacts 20a, 20b to be connected, wire transposition is required in the second longitudinal section 12. For this purpose, the wires initially arranged in a clockwise direction in the order A, D, C, B, (cp. FIG. 1) are transposed by means of the appliance 30 and fastened as follows. First, the wires A, C of the first pair are inserted into the feed-through openings of the retainers 33a, 33b. Next, the appliance 30 is turned by an angle of rotation that is greater than the angular distance between two neighboring wires. In particular, the appliance 30 is rotated by 180° around its longitudinal axis. Then the wires B, D of the second pair can be inserted into the retainers 34a, 34b and fastened in particular with a clamp. On the one hand, a defined wire transposition is achieved this way. On the other hand, the wires A, B, C, D in the third longitudinal section 13 are fastened at the desired relative distance to each other, wherein in particular the distance a' between the wires A, D as well as the distance a' between the wires B, C is smaller than the distance a" between the wires A, B and the distance a" between the wires D, C (compare FIG. 3b).

The arrangement of the wires in a clockwise direction is now A, B, C, D both at the first end 10a of the cable 10 as well as on the second end 10b of the cable 10, so that a connecting contact 20a can be connected to the first end 10a and a connecting contact 20b to the second end 10b, wherein both connecting contacts 20a, 20b comprise identical pin assignments. The free ends of the wires A, B, C, D are connected to the corresponding contacts 21 of the connecting contacts 20a, 20b, wherein the relative arrangement of the wires A, B, C, D, is changed again when the wires A, B, C, D of the second end 10b of the cable 10 are connected in such a way that the distances of the neighboring wires A, B and A, D or B, C, and D, C are again identical, which means that the angle of intersection between the planes of the wire pairs is 90°.

FIG. 7 shows a comparison of the transmission properties NEXT (Near End Crosstalk) of a connecting contact with a wire routing according to the state of the art such as illustrated in the FIGS. 2a, 2b as well as a connecting contact with a wire routing according to the invention as illustrated in the FIGS. 3a and 3b. The curve numbered 50 represents a bounding curve in the category 6A for the NEXT values. The curve numbered 51 shows the NEXT values of a connecting contact according to the state-of-the art with wire routing according to the FIGS. 2a and 2b, wherein these values are above the intended bounding curve 50 within a large frequency range and are therefore worse than desired. The curve 52 refers to the NEXT values of a connecting contact according to the invention with wire routing according to the FIGS. 3a and 3b. It shows that the NEXT values of the connecting contact according to the invention are below the intended bounding curve 50 within the depicted frequency range which means that the wire arrangement according to the invention achieves a significant improvement of the transmission properties of the cable 10.

LIST OF REFERENCE SIGNS

10 Cable
10a First end
10b Second end
11 First longitudinal section
12 Second longitudinal section
13 Third longitudinal section
A First wire of the first pair
B First wire of the second pair
C Second wire of the first pair
D Second wire of the second pair
20a Connecting contact
20b Connecting contact
21 Contact
30 Appliance for fastening wires
31 First section
32 Second section
33a Retainer
33b Retainer
34a Retainer
34b Retainer
50 Bounding curve
51 NEXT values
52 NEXT values
a, a', a'' Distance
d Distance
$\alpha$ Angle of intersection
$\beta$ Angle of intersection
$\gamma$ Angle of intersection

What is claimed is:

1. An electric cable comprising at least four wires arranged in a first and a second pair, wherein each of the pairs comprises a first and a second each, wherein the wires belonging to the first pair are arranged parallel to each other in a first plane in at least a first and a third longitudinal section and the wires belonging to the second pair are arranged parallel to each other in a second plane and the two planes intersect in a line of intersection, wherein the line of intersection runs parallel to the wires and the distances between each wire and the line of intersection are identical, wherein the angle of intersection ($\gamma$) between the planes is 90° in at least the first longitudinal section and wherein the first wire of the first pair is transposed with the first wire of the second pair and the second wire of the first pair is transposed with the second wire of the second pair in a second longitudinal section, characterized in that the angle of intersection ($\alpha$) between the planes is different from 90° in at least the third longitudinal section.

2. An electric cable according to claim 1, wherein the angle of intersection ($\alpha$) between the planes is between 40° and 80° in the third longitudinal section.

3. An electric cable according to claim 1, wherein the cable comprises a first and a second connecting contact, wherein the first longitudinal section is arranged in sections in the first connecting contact and the third longitudinal section is arranged in sections in the second connecting contact.

* * * * *